Figure 4:
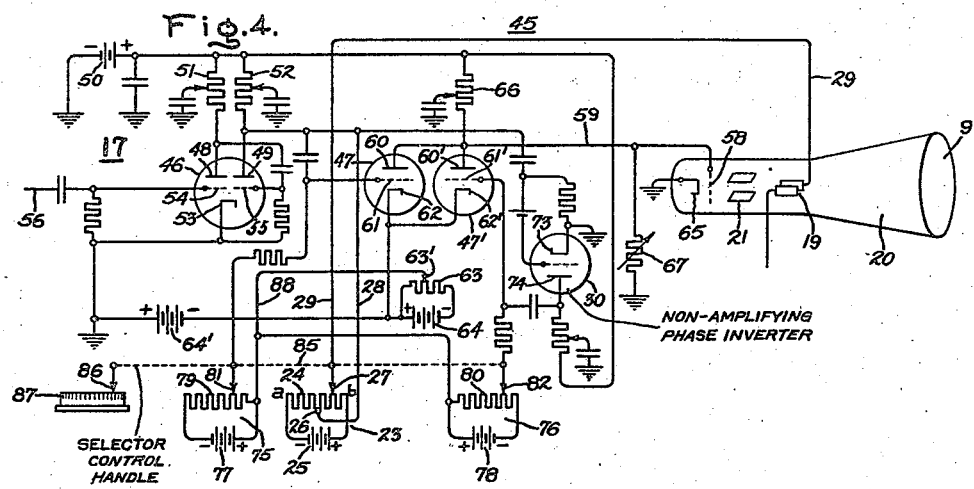

May 7, 1946.  J. L. THEISEN  2,399,955
OSCILLOSCOPE WAVE EXPANSION
Filed June 30, 1942   3 Sheets-Sheet 1
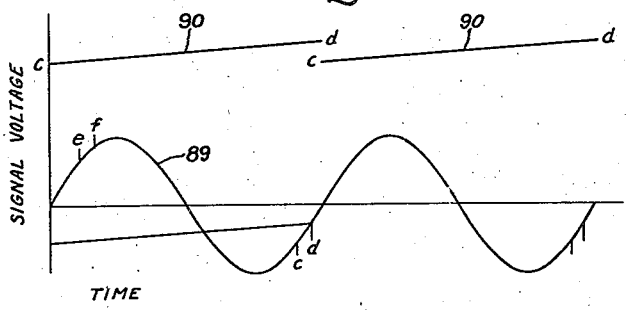
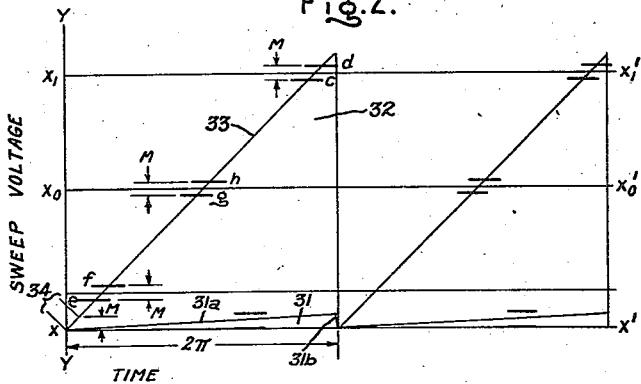
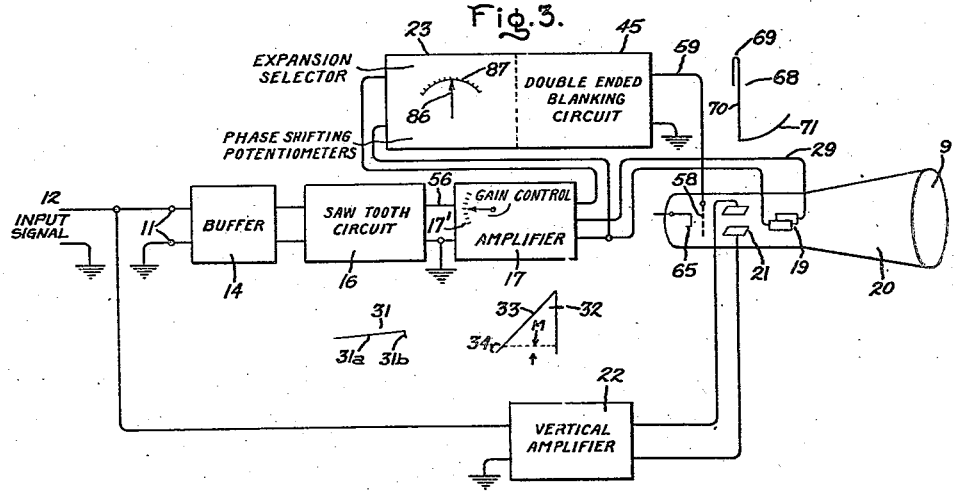
Inventor:
Joseph L. Theisen,
by Harry E. Dunham
His Attorney Inventor:
Joseph L. Theisen,
by Harry E. Dunham
His Attorney.

Patented May 7, 1946

2,399,955

UNITED STATES PATENT OFFICE 2,399,955

OSCILLOSCOPE WAVE EXPANSION

Joseph L. Theisen, Marblehead, Mass., assignor to General Electric Company, a corporation of New York Application June 30, 1942, Serial No. 449,077

5 Claims. (Cl. 315—24)

This application is a continuation-in-part of my copending application, Serial No. 404,967, filed August 1, 1941, and assigned to the same assignee as the present application.

My invention relates to wave-examining systems or oscillographic devices of the visual or recording type and concerns particularly oscilloscopes of the type having a signal-tracing beam, such as cathode ray oscilloscopes, with means for deflecting the beam in a given plane in response to a signal wave to be examined in the oscilloscope and for deflecting the beam in a transverse plane in response to a time-axis or "sweep" wave.

It is an object of my invention to provide methods and apparatus for expanding on the screen of the oscilloscope an image of a portion of the signal wave to be observed, and for selecting any desired portion of the signal wave for expansion.

It is a more specific object of my invention to provide methods and apparatus for modifying the shape of the "sweep" wave of the oscilloscope and to introduce a portion of greater steepness for expansion of the wave.

Other and further objects and advantages will become apparent as the description proceeds.

For convenience and simplicity the invention is described in connection with cathode ray oscilloscopes having deflection plates for electrostatic deflection of the beam. However, my invention is not limited to this particular form of apparatus.

In carrying out my invention in its preferred form I utilize discharge tube circuits for producing a sweep wave for application to the sweep deflection plates of the oscilloscope. The basic portion of the sweep-wave circuit may be similar to the basic portion of sweep-wave circuits devised by others, e. g. such as disclosed in the copending applications of Ellsworth D. Cook, Serial No. 338,360, filed June 1, 1940, and Harris A. Thompson, Serial No. 350,409, filed August 3, 1940, both assigned to the same assignee as the present application. However, I produce expansion of the wave by greatly amplifying the normal triangular or sawtooth wave of the conventional sweep-wave circuit, so that but a small portion of the amplified wave represents full deflection in the direction of the time axis of the oscilloscope screen which is usually the horizontal axis. In order to prevent the cathode ray beam from striking the sides of the tube or the anode plates and thus overloading the beam-energizing circuit, I provide means for suppressing the portion of the sweep wave beyond that utilized for producing full scale deflection of the cathode ray beam. For this purpose I may either cut off the excess portion of the sweep wave or suppress the beam itself during the unwanted portions of the sweep wave. The signal wave, the shape of which is to be represented on the cathode ray screen, is applied to signal deflection producing or vertical deflection plates of the cathode ray tube. For selecting the portion of the signal wave which is to be expanded or spread across the cathode ray screen, I provide a phase-shifting circuit arranged to select the portion of the high speed sweep wave applied to the horizontal plates.

My invention will be understood more readily from the following detailed description when considered in connection with the accompanying drawings and those features of the invention which are believed to be novel and patentable are pointed out in the claims appended hereto.

Figure 5:
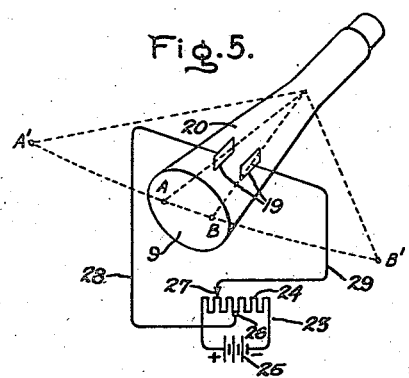
Figure 6:
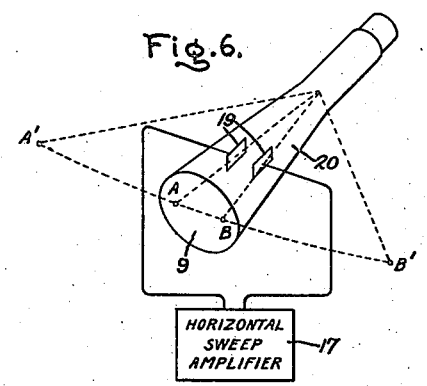
Figure 7:
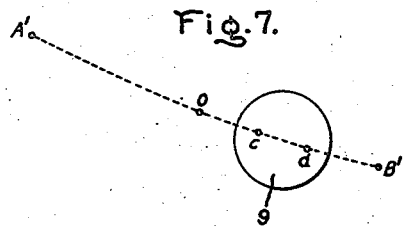
Figure 8:
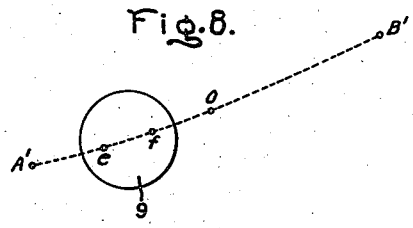
Figure 9:
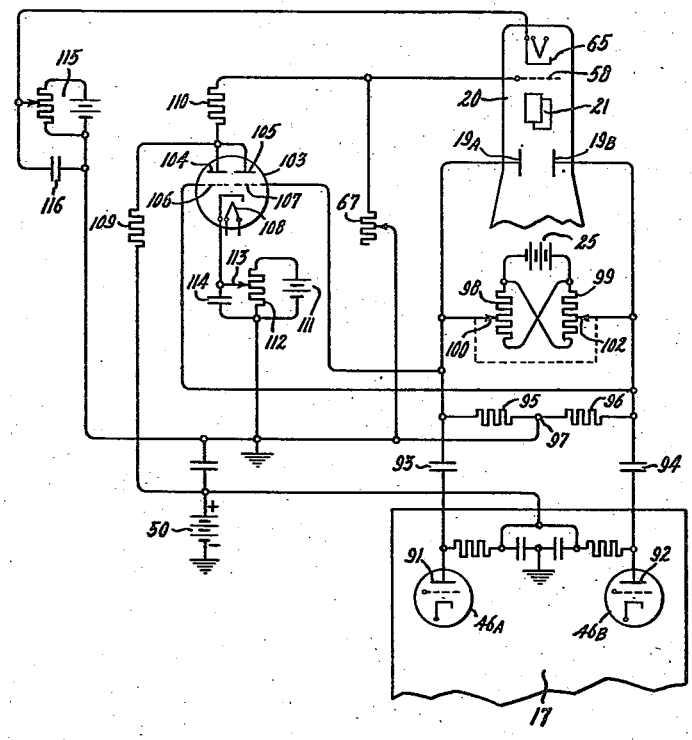

In the drawings Fig. 1 is a graph illustrating a signal wave to be examined in the oscilloscope, shown as a sine wave by way of example, and illustrating the effect of expansion of a selected portion of a signal wave; Fig. 2 is a graph illustrating sawtooth sweep waves, one of sufficient magnitude to sweep the oscilloscope beam completely along the time axis in the course of a single cycle and the other greatly amplified for speeding up the sweep wave and producing expansion of a selected portion of the signal wave; Fig. 3 is a block diagram schematically representing a sweep wave circuit which constitutes one embodiment of my invention; and which represents diagrammatically the shapes of waves appearing in various portions of the circuit; Fig. 4 is a circuit diagram schematically representing actual electric circuits and elements of the apparatus represented by the rectangles captioned "Amplifier," "Double ended blanking circuit," and "Expansion selector" in Fig. 3; Figs. 5 and 6 are schematic diagrams partially representing an oscilloscope tube in perspective for the purpose of illustrating the principle of operation of the apparatus; Figs. 7 and 8 are diagrams further explaining the principle of operation; and Fig. 9 is a fragmentary circuit diagram of a modified arrangement. Like reference characters are used throughout the drawings to designate like parts.

As in the apparatus described in the aforesaid Cook and Thompson applications, the sweep wave is synchronized with a signal voltage by tapping off a portion of the signal wave or a voltage proportional to it, and applying such voltage, as a synchronizing voltage, to input terminals of the sweep-wave circuit. Accordingly, a pair of synchronizing terminals 11 is provided to which is applied the input signal 12 or a voltage representing it. (Fig. 3.) The basic portion of the sweep-wave circuit consists of a synchronizing amplifier or buffer 14, and a sawtooth circuit 16. The foregoing elements may be conventional in form, and do not in themselves constitute my invention.

In order to increase the speed of the sweep wave I provide an amplifier 17, the input of which is connected to the output side of the sawtooth circuit 16. In addition I provide an arrangement 23 for selecting the portion of the signal wave to be expanded, and I provide a blanking circuit 45. The amount of horizontal expansion obtained may be made adjustable by providing for adjustment of the amplitude of the sweep signal. For example, the amplifier 17 may be provided with a gain control 17'. In the arrangement illustrated the output of the amplifier circuit 17 is applied to a pair of electrostatic deflection plates 19 of a cathode ray tube 20 and the sweep wave is a voltage wave. However, my invention is not limited to use with oscillographic devices of the type having electrostatic sweep instead of electromagnetic sweep, for example, wherein deflection coils are used carrying a current wave of corresponding wave-form. The plates 19 are those for producing deflection of the cathode ray beam along the time axis or sweep axis and are referred to for convenience as the horizontal deflection plates, since the time axis is usually horizontal. The input signal 12 is applied to vertical deflection plates 21 of the cathode ray tube 20 usually through a vertical amplifier 22. For, in effect, shifting the phase relationship between the acting portion of the sweep wave and the signal wave to be examined, I provide the arrangement 23 for selecting the portion of the amplified sweep wave which occurs between the horizontal deflection plates 19. This arrangement may take the form of an adjustable voltage source for superimposing a potential difference on the horizontal deflection plates and shifting the zero of the time axis in one direction or the other, even beyond the oscilloscope screen, the sweep-wave having been amplified to such an extent that the entire horizontal length of the oscilloscope screen represents but a small part of the sweep wave. This source (Figs. 4 and 5) may comprise a potentiometer resistor 24, connected across a source of direct current 25, with a fixed mid terminal 26 and an adjustable tap 27, the terminals 26 and 27 being connected to a pair of conductors 28 and 29, respectively, adapted to be interposed in the output circuit of the amplifier 17. The buffer 14 consists of a suitable amplifier circuit of a type well known to those skilled in the radio frequency art.

The sawtooth circuit 16 is a conventional circuit for producing a sawtooth wave of the shape shown by the curve 31, having a rising portion 31a and a fly-back portion 31b (Figs. 2 and 4). After passing through the amplifier 17 the sawtooth triangular wave 31 appears in a greatly amplified form as represented schematically at 32 in which the rising portion 33 of the wave 32 is greatly increased in slope for rapidly sweeping the cathode ray beam across the screen of the tube. It will be understood of course that the curves 31 and 32 are simply schematic and are not intended to represent the actual or most desirable ratio of amplification.

As indicated in Fig. 2, the curve 32 is amplified to such an extent that a very small portion 34 of the entire wave, corresponding to a sweep voltage value designated M represents full horizontal deflection of the cathode ray beam. In order to prevent injury to the tube or overloading which would occur from allowing the beam to be driven against the side of the tube or against the deflection plates 19, the blanking circuit 45 is provided for the purpose of cutting off the cathode ray beam of the oscilloscope tube 20 when the sweep wave 32 deviates in voltage an amount represented by the distance M corresponding to the full scale deflection across the oscilloscope screen along the horizontal or time axis. The amplifier 17 may consist of one or more vacuum tube stages with a voltage tapped from one of the stages to operate the blanking circuit 45. The arrangement may be such as that illustrated in Fig. 4, for example, in which a double triode vacuum tube 46 is provided to serve as the last two stages of the amplifier 17. Two triode vacuum tubes 47 and 47' serve as the controlling elements of the blanking circuit 45.

The tube 46 comprises a pair of anodes 48 and 49 to which a source of anode voltage 50 is connected through a pair of anode resistors 51 and 52, the mid points of which are grounded through ripple-absorbing condensers. There is a common cathode 53 which is grounded, and there are grids or control electrodes 54 and 55 associated with the anodes 48 and 49 respectively. The grid 54 is capacitatively coupled to the output of the previous stage of the amplifier or, if the amplifier consists of only two stages, to the conductor 56, to which the positive output of the sawtooth circuit 16 is connected. The grid 55 is capacitatively coupled to the anode 48 in accordance with the well-known resistance capacity amplifier coupling. The amplifier output appears at the anode 49 and is applied through a conductor 29, and through that part of a potentiometer 24 which is between parts 26 and 27, to one of the horizontal deflection plates 19 of the cathode ray tube 20. It will be understood that the other horizontal deflection plate is either grounded or held at a fixed potential by a suitable device such as a potentiometer in accordance with the well-known cathode ray oscilloscope practice.

In order to suppress the cathode ray oscilloscope beam when the voltage of the sweep wave 32 deviates an amount corresponding to full scale deflection across the oscilloscope screen, the control electrode or grid 58 of the oscilloscope tube 20 is connected through a conductor 59 to the output of the blanking circuit 45. As shown in Fig. 4, the blanking circuit includes the tubes 47 and 47'. The tube 47 has an anode 60 to which the output conductor 59 is connected, a control electrode or grid 61, and a cathode 62. The tube 47' is similar to the tube 47, having corresponding elements designated by primed numbers.

The discharge tube 47 may advantageously be a vacuum tube of the type having a sharp upward bend in the characteristic curve representing the relationship between its anode current plotted along a vertical axis and its grid voltage plotted along a horizontal axis. The grid 61 is capacitatively coupled to the output terminal of the amplifier 17, which is the anode 49 of the tube 46. In order to cause the blanking tube 47 to operate near the bend in its characteristic curve, an adjustable negative bias is applied thereto. This may take the form of a potentiometer 63 connected across a voltage source 64 connected on the positive side to the cathode 62. In order that the blanking tube 47 may supply an adequate negative potential at proper times, its cathode 62 is held negative with respect to the cathode 65 of the cathode ray oscilloscope tube 20. The cathode 62, for example, may be connected to the negative side of a voltage source 64' grounded in the positive side, the oscilloscope cathode 65 being grounded. The blanking-tube anode 60 is connected to the positive side of a source of anode voltage, such as the source 50, through an anode resistor 66 which also has its mid-point bypassed through a ripple-absorbing condenser connected to ground. The constants of the circuits, the characteristics of the tube 47 and the bias voltage provided by the grid bias potentiometer 63 are so chosen as to cause the blanking tube 47 to become strongly conducting, when the voltage of the wave 32 appearing at the amplifier anode 49 rises an amount represented by the distance M. (Fig. 2.) Since the tube 47 is one having the aforesaid sharp bend characteristic, as long as the sweep-wave voltage applied to the grid 61 remains below the value M, the anode current of the tube 47 is negligible and a positive voltage is maintained on the cathode ray oscilloscope grid 58. However, when the sweep-wave voltage rises more than the value M, the bend in the characteristic curve of the tube 47 is passed and a relatively heavy discharge current flows through the tube 47 causing a large voltage drop in the anode resistor 66, depressing the voltage of the oscilloscope grid 58 below that of the oscilloscope cathode 65 and cutting off the cathode ray beam to suppress the wave traced on the screen.

It will be understood that suitable means, adjustable if desired, are ordinarily provided for normally maintaining the potential of the oscilloscope grid 58 at the value which produces the most satisfactory operation. This may take the form of a voltage divider, for example. Such a voltage divider is represented in Fig. 4 by the anode resistor 66 and a rheostat 67 of suitable value connected between the anode 60 and ground. Thus normally the potential of the oscilloscope grid 58 is fixed by the ratio between the resistance of the rheostat 67 and the resistance 66 which are connected in series to the voltage source 50. However, when the blanking tube 47 becomes strongly conducting it draws current of such magnitude through the anode resistor 66 as to depress the grid voltage of the oscilloscope 58. The approximate shape of the voltage wave applied to the grid 58 is represented in Fig. 3 by the curve 68 as shown to the right of the rectangle representing the blanking circuit 45. It will be observed that for the time duration of the steep portion 34 of the curve 32, the curve 68 remains positive as represented by the positive loop 69. However, when the sweep-wave voltage rises more than the value M the anode voltage of the blanking tube 47 drops abruptly along the line 70 but remains strongly negative with respect to the oscilloscope 65 until the sweep voltage falls again by the amount M. The exact shape of the negative portion 71 of the curve 68 will of course depend on the characteristics of the tube 47.

The blanking tube 47' is connected in a manner similar to the tube 47, except for its input connection. For the purpose of making the tube 47' act when the sweep wave voltage falls more than a predetermined amount instead of when it rises, a suitable inversion circuit or phase inverter is interposed between the anode 49 of the amplifier tube 46 and the control electrode 61' of the blanking tube 47'.

The phase inverter may take the form of a vacuum tube 30 having suitable internal and circuit constants for forming a conventional non-amplifying phase inverter. For example, as illustrated it has a control electrode 73, resistance capacity coupled to the anode 49 of the amplifier tube 46 and has an anode 74 to which the control electrode 61' of the blanking tube 47' is resistance capacity coupled.

The arrangement 23, for selecting the portion of the signal wave to be examined serves to shift the effective zero of the time axis back and forth according to the portion of the signal wave to be expanded. Accordingly means are provided for adjusting the blanking circuits to cause the oscilloscope beam to be cut off when the beam approaches either end of the actual time axis of the oscilloscope screen. Preferably the arrangement is such that adjustment of the blanking circuits is changed automatically as the device 23 is adjusted for selecting different portions of the signal wave for expansion. For example, as illustrated in Fig. 4 a potentiometer 75 may be provided for increasing the negative bias of the control grid of the blanking tube 47, when the device 23 is operated to shift the effective zero of the time axis to the left from an extreme right-hand position. Similarly, an oppositely arranged potentiometer 76 is provided for increasing the negative bias of the control grid of the blanking tube 47' when the device 23 is operated to shift the effective zero of the time axis of the oscilloscope to the right from the extreme left-hand position.

The potentiometers 75 and 76 may consist of direct current sources 77 and 78 across which potentiometer resistors 79 and 80 are connected having sliding taps 81 and 82 respectively. The expansion selector arrangement 23 has a corresponding sliding tap 27 cooperating with the potentiometer resistor 24 as previously mentioned. The three sliding taps 81, 82 and 27 are connected to a common operating member shown in Fig. 4, such as a bar 85, which is connected to a pointer 86 and which cooperates with a scale 87.

It will be observed that the right-hand end of the potentiometer resistor 79 and the left-hand end of the potentiometer resistor 80 are connected to the positive terminals of the sources 77 and 78 respectively and are both connected by a conductor 88 to the tap 63' of the potentiometer 63 which serves as the negative end of either of the control grid circuits of the tubes 47 and 47'. The sliding tap 81 is connected to the control grid 61 of the tube 47 and similarly the sliding tap 82 is connected to the control grid 61' of the blanking tube 47'. Thus the blanking tube adjusters 75 and 76 vary the control grid bias of the blanking tubes 47 and 47' oppositely as the arm 85 is moved in one direction or the other for adjusting the device 23 to select the portion of the signal wave to be expanded.

The manner in which the device 23 operates to select the portion of the signal wave to be expanded may be observed from a consideration of the simplified diagrams 5 and 6. Let it be assumed first that the amplifier 17 of Fig. 3 is omitted. The magnitude of the voltage deviation produced by the sawtooth circuit 16 is presumed to be sufficient to deflect the oscilloscope beam along the time axis back and forth from one end to the other of the horizontal or time axis of the oscilloscope screen 9, that is, back and forth between the points A and B.

If the horizontal sweep amplifier 17 is in operation the sweep voltage is amplified and the oscilloscope beam is swept back and forth at an increased sweep speed. It would tend to move through a greatly increased angle from the points A' to B' if the construction and arrangement of the oscilloscope tube 20 permitted such a wide sweep angle. However, the points A' and B' are merely hypothetical for the purpose of explanation. The magnitude of the voltage source 25 is so chosen that the movement of the sliding tap 27 back and forth along the potentiometer 24 between the limits of movement a and b would also tend to produce deflection of the oscilloscope beam between the hypothetical limits A' and B'. Fig. 5 shows a simplified circuit with only the expansion selector arrangement 23 in the horizontal deflection circuit, and Fig. 6 shows only the horizontal sweep 17 in the horizontal deflection circuit.

As shown in Fig. 4, the voltages of the devices 17 and 23 are in series. Then as illustrated in Fig. 7 the oscilloscope beam still tends to sweep back and forth between the hypothetical limit points A' and B', but the hypothetical zero or center of the time scale is shifted to the left if the tap 27 of the device 23 is shifted to the left. Actually the oscilloscope beam can move only from one end to the other of the horizontal axis of the screen and only a portion $cd$ of the hypothetical range A'B' is actually effective. Thus the portion of the signal wave $cd$ occurring between the points $c$ and $d$ of the hypothetical time axis is produced in greatly expanded form (Figs. 1 and 7). If the sliding tap 27 of the expansion selecting device 23 is moved to the right instead of to the left, the hypothetical zero or center of the range A', B' is shifted to the right and only the portion of the hypothetical range between the points $e$ and $f$ is effective for deflecting the oscilloscope beam. Accordingly the portion of the signal wave occurring during the interval $e$, $f$ is produced on the oscilloscope screen in expanded form (Figs. 1 and 8). In order to prevent destruction of the tube, it is necessary to a provide a double-ended blanking circuit 45 for cutting off the oscilloscope beam whenever it approaches either end of the actual time axis of the oscilloscope screen 9. The manner in which this is accomplished is illustrated in Fig. 2.

In Fig. 2 the output wave 31 of the sawtooth circuit 16 is plotted along the $x$, $x'$ axis (sweep voltage is measured in a vertical direction and time in a longitudinal direction). This wave is amplified by the amplifier 17 and appears as a wave 32 plotted in Fig. 2 along the $x$, $x'$ axis. The vertical distance M is the permissible deviation in the sweep wave voltage corresponding to sweeping the beam from one end to the other of the actual oscilloscope horizontal axis; for example, between the points A and B in Figs. 5 and 6, between $c$ and $d$ in Fig. 7 and between $e$ and $f$ in Fig. 8. In Fig. 2, for convenience, the height of the unamplified sweep wave 31 is shown as equalling the distance M. It will be understood, however, that the actual maximum deviation of the unamplified wave 31 does not necessarily bear any relation to the value M and length of the actual oscilloscope horizontal axis since in the apparatus illustrated the sweep wave 16 is greatly amplified and only the amplified wave 32 is applied to the sweep plates for expansion purposes.

If the adjustment tap 27 of the expansion selecting device 23 is set at the mid point 26 of potentiometer 24, the hypothetical range A' or B' will be symmetrical with respect to the oscilloscope screen and only the portion between the ordinates $g$ and $h$ of the rising portion 33 of the sweep wave will be effective (Fig. 2). The amplified sweep wave 32 then in effect has its axis shifted to the line $xo$, $xo'$ shown in Fig. 2. Moving the adjustment tap 27 toward the right on the potentiometer 24 has the effect of shifting the horizontal axis of the sweep wave 32 to the line $x_1$, $x_1'$ as illustrated in Fig. 2. For this latter condition, as illustrated in Fig. 1, only the portion of the signal wave 39 between the points $c$ and $d$ on the time axis will be produced on the screen 9 and the sweep speed will be so great that this portion of the wave is greatly expanded to form a segment 50.

Referring to Fig. 4 when the tap 27 is in the extreme right-hand position, the tap 81 is also in the extreme right-hand position and the potentiometer 79 provides no supplementary bias to the control grid 61 of the blanking tube 47. Consequently as soon as the sweep voltage appearing at the anode 49 of the tube 46 rises from its minimum value by an amount M, the tube 47 is caused to become conducting. Its anode 60 becomes negative and the control grid 58 of the oscilloscope 20 likewise becomes negative and cuts off the beam of the oscilloscope. If the taps 81 and 27 are moved somewhat to the left for the purpose of selecting a different portion of the signal wave for expansion, for example, the portion $e$, $f$, the oscilloscope beam will not strike the right-hand end of the time axis of the screen, viz: the point $f$ until the magnitude of the sweep wave has risen somewhat higher as illustrated in Fig. 2. However, in this case also the deviation in voltage of the sweep wave for the setting of the taps 81 and 27 is equal to the value M. In order that the sweep wave will not be cut off until the sweep wave voltage has reached the magnitude represented by the point $f$ in Fig. 2, the adjusting device 75 of Fig. 4 is provided. This supplies additional negative bias corresponding to the negative voltage introduced in the horizontal sweep circuit by the expansion selecting device 23. Consequently the control grid 61 of the blanking tube 47 does not reach the value required for cutting off the oscilloscope beam until the sweep wave voltage has reached the value $f$ represented in Fig. 2.

However, on the return sweep as soon as the sweep voltage falls below the value $e$ illustrated in Fig. 2, it will be necessary to cut off the oscilloscope beam to avoid destruction of the oscilloscope tube 20. This is accomplished by the blanking tube 47' and its adjuster 76. Since the inversion circuit 30 is interposed in advance of the blanking tube 47', it operates on a falling sweep voltage instead of a rising sweep voltage. With the tap 82 at the extreme left-hand position, that is, at the positive end of the potentiometer resistor 80, the blanking tube 47' operates when the sweep voltage has fallen from its maximum value by an amount M. With the taps 81, 82 and 27 in the position shown in Fig. 4 nearly all of the negative bias of the potentiometer 83 is inserted in the control grid circuit of the blanking tube 47' the blanking tube 47' becomes operative only when the sweep voltage falls below the value represented by the ordinate $e$ in Fig. 2.

It will be observed that for any setting of the control bar 85, the blanking tube 47 will operate when the sweep voltage rises above a predetermined value and the blanking tube 47' will operate when the sweep voltage falls below a predetermined value, and these two predetermined values will differ by an amount M, which represents the voltage required to sweep the beam from one end to the other of the horizontal axis of the oscilloscope screen 9. Furthermore, since the taps 81, 82 and 27 are ganged, the operation of the blanking tube adjusters 75 and 76 is synchronized with the operation of the device 23 for selecting the operation of the signal wave to be expanded and the oscilloscope beam is blanked out except during the interval of time that it is impinging on the screen.

If desired a blanking circuit may be provided which is directly responsive to the voltages on the horizontal or time sweep plates 19 and which becomes effective in response to excessive voltage on either of the horizontal sweep plates. For example, an arrangement may be employed such as shown in Fig. 9 which has the advantage of ganging fewer potentiometers than in the arrangement shown in Fig. 4.

In the arrangement of Fig. 9 a horizontal amplifier 17 is employed having a final stage employing a push-pull connection represented by tubes 46A and 46B. For the sake of simplicity Fig. 9 is drawn as a fragmentary circuit diagram showing primarily the modified portions of the arrangement of Figs. 3 and 4. The push-pull arrangement employed in tubes 46A and 46B is conventional and, accordingly, only the output circuit of the tubes 46A and 46B is shown. The anodes 91 and 92 of the tubes 46A and 46B are coupled through condensers 93 and 94 to the horizontal sweep plates, designated in Fig. 9 as 19A and 19B, respectively. Resistors 95 and 96 are connected in series between the plates 19A and 19B and have a common terminal 97 which is grounded. In this manner variations in the voltage output of the amplifier 17 produce opposite variations in potential with respect to ground on the horizontal sweep plates 19A and 19B. As in the arrangement represented by Figs. 3 and 4 the amplitude of the output of the amplifier 17 is made considerably greater than that required to sweep the oscilloscope beam the length of the horizontal axis of its screen for the purpose of increasing the speed of the horizontal sweep wave and causing the selected portion of the signal wave to be expanded.

In order to change the effective center point of the horizontal sweep wave and thereby select the portion of the signal wave which is to be examined, a potentiometer arrangement is provided for supplying adjustable supplementary voltage to the horizontal sweep plates 19A and 19B. As illustrated in Fig. 9, this takes the form of a double potentiometer consisting of a pair of resistors 98 and 99 connected in parallel across a voltage source consisting of a battery 25 and having a pair of ganged or mechanically connected taps 100 and 102 which move along the resistors 98 and 99, respectively, in unison. The resistors 98 and 99 are so connected and positioned that the potentials on the taps 101 and 102 vary in opposite directions as the taps are moved in one direction or the other. The taps 101 and 102 are electrically connected to the horizontal sweep plates 19A and 19B, respectively.

For extinguishing the oscilloscope beam when the voltage on either sweep plate 19A or 19B reaches a limit beyond which the beam would be deflected too far toward the ends of the horizontal axis of the screen, that is, too far toward the side walls of the cathode ray oscilloscope 20, a blanking circuit is provided represented by twin tube 103. The blanking circuit is so connected that it is directly responsive to voltages on the horizontal sweep plates 19A and 19B and no mechanical connection or ganging with the expansion selector potentiometer 98—99 is required. The blanking circuit utilizes an electric discharge device which may take the form of a twin triode vacuum tube such as designated by the reference numeral 103. The tube 103 includes a pair of anodes 104 and 105, a pair of control electrodes 106 and 107 and a common cathode 108. Thus, one triode section is formed by the elements 104, 106 and 108, and the other triode section is formed by the triodes 105, 107 and 108. The anodes 104 and 105 are connected to the positive terminal of the anode voltage source 50 through an anode resistor 109. A voltage divider for determining the potential of the oscilloscope control grid 58 is provided which consists of resistor 110 and a rheostat 67 connected in series between the anodes 104, 105 and ground, the junction terminal of the resistor 110 and the rheostat 67 being connected to the oscilloscope control electrode 58.

The blanking tube control electrodes 106 and 107 are connected to the oscilloscope horizontal sweep plates 19A and 19B, respectively, for causing the blanking tube 103 to become effective when the potential on either sweep plate 19A or 19B reaches a predetermined limit. In order to prevent the blanking tube 103 from becoming effective until a fixed voltage limit is reached, an initial bias is provided in the circuit of the blanking tube 103 by providing a source of voltage between the cathode 108 and the ground connection of the apparatus. For the purpose of adjusting the voltage limits the bias voltage may be made adjustable taking the form of a voltage source such as a battery 111 shunted by a potentiometer resistor 112 having one end connected to ground and having an adjustable tap 113 connected to the blanking tube cathode 108. A by-pass condenser 114 with proper capacity for the frequencies involved is connected between the cathode and ground to avoid any degenerative effect from the cathode resistor 112.

To provide control potential adjustment for the oscilloscope 20, its cathode 65 may be connected to a source of adjustable positive bias consisting of a battery and potentiometer combination 115 shunted by a by-pass condenser 116 of sufficient value for the frequencies involved.

It will be observed that the sweep wave voltage output produced by the amplifier 17 will appear on the horizontal sweep plates 19A and 19B of the oscilloscope and that the wave may be shifted in one direction or the other from neutral or ground voltage by adjustment of the gang potentiometer taps 101 and 102, thereby selecting the portion of the signal wave which is expanded as previously explained in connection with Figs. 5 to 8, inclusive. If the voltage on either of the sweep plates 19A or 19B exceeds the value for which the control electrodes are biased, one triode section of the tube 103 becomes strongly conductive and, accordingly, a large drop in potential takes place through the anode resistor 109 lowering the potential of the anodes 104 and 105. In consequence the potential of the oscilloscope control electrode 58 is lowered in relation to the potential of its cathode 65 to such a value as to cut off the oscilloscope beam of the oscilloscope tube 20. Adjustment of the oscilloscope control electrode potential to the proper values to obtain adequate strength of beam during expansion of the signal wave and blanking during the remainder of the signal wave is obtained by adjustment of the rheostat 67 and the oscilloscope bias potentiometer 115.

I have herein shown and particularly described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims.

What I claim as new and desire to secure by Letters Patent of the United States is:

1. A signal wave expansion arrangement for a sweep wave circuit of an oscilloscopic device having a signal tracing beam, comprising in combination with a sawtooth wave generator adapted to produce a sweep wave for generating a signal tracing beam along a sweep axis of the oscilloscopic device and spreading an image of the signal wave on the screen of the oscilloscopic device, an amplifier for increasing the amplitude of the sweep wave and thus increasing its slope to increase the speed of sweep and thereby expand the portion of the signal wave to be traced, a device for superimposing an adjustable voltage on the output wave of the amplifier for selecting the portion of the sweep wave which is effective in deflecting the beam within the limits of the time axis of the oscilloscope and a device, synchronized with said adjusting device responsive to voltage variations above and below the voltage deflecting the signal tracing beam to the permissible limits of the sweep axis, for preventing further sweep of the signal tracing beam.

2. An oscilloscopic sweep wave generator comprising generating means for producing a triangular wave adapted to be applied to one of the deflection circuits of a cathode ray oscilloscope with a control grid and of greater peak value than required for full scale deflection, a device for superimposing an adjustable voltage on said triangular sweep wave for shifting the effective center of the sweep axis in one direction or the other from the actual center of the oscilloscope, a blanking circuit responsive to rise and fall of the sweep wave beyond predetermined limits having output terminals adapted to be connected to the grid circuit of said oscilloscope for applying a negative voltage therein of sufficient value to cut off the cathode ray beam whenever the sweep wave deviates beyond said limits, said blanking circuit having adjusting mechanism interconnected with said first-mentioned adjusting device for shifting the voltage limits at which the blanking circuit cuts off the cathode ray beam whereby the oscilloscope beam is cut off when it deflects to the edge of the oscilloscope screen and the slope of the used portion of the sweep wave is caused to be relatively great to produce high speed sweep and expansion of the signal wave to be examined during a portion of the cycle of the signal wave to be examined.

3. An oscilloscopic sweep wave generator comprising generator means for producing a triangular voltage wave adapted to be applied to one of the deflection circuits of a cathode ray oscilloscope with a control grid, but of greater peak value than required for full scale deflection, an adjustable device for superimposing a fixed value of voltage on said triangular wave for shifting the effective center of the triangular wave with respect to the center of the cathode ray oscilloscope for rendering a predetermined portion of the triangular wave effective in producing deflection of the cathode ray beam of the oscilloscope, a blanking circuit responsive to rise of the sweep wave above a predetermined value and a second blanking circuit responsive to fall of the sweep wave below a predetermined value, said blanking circuits having a common output terminal adapted to be connected to the control electrode or grid circuit of the oscilloscope for applying a negative voltage therein of sufficient value to cut off the cathode beam whenever the sweep wave deviates beyond said limits, a device interposed between said sweep wave generator and the first of said blanking circuits for inserting an adjustable biasing voltage, a second device interposed between said sweep wave generator and said second blanking circuit for inserting a second adjustable voltage and an interconnecting device for adjusting the voltages of said last two adjustable devices in opposite directions simultaneously with the adjustment of said first-mentioned adjustable device.

4. A signal wave expansion arrangement for a sweep wave circuit of an oscilloscopic device having a signal tracing beam comprising in combination with a sawtooth generator adapted to produce a sweep wave voltage for generating a signal tracing beam along a sweep axis of the oscilloscopic device and spreading an image of the signal wave on the screen of the oscilloscopic device, an amplifier for increasing the amplitude of the sweep wave and thus increasing its slope to increase the speed of sweep and thereby expand the portion of the signal wave to be traced, a device for superimposing an adjustable voltage on the output wave of the amplifier for selecting the portion of the sweep wave which is effective in deflecting the beam within the limits of the time axis of the oscilloscope and a device responsive to voltages of the sweep wave exceeding predetermined limits for preventing further sweep of the signal tracing beam.

5. A sweep wave generator for a cathode ray oscilloscope having deflection circuits and a control grid, said generator comprising generating means for producing a sweep wave adapted to be applied to one of the deflection circuits of the cathode ray oscilloscope and of greater peak value than required for full scale deflection, and a blanking circuit responsive to rise and fall of the sweep wave beyond predetermined limits, having output terminals adapted to be connected to the grid circuit of the oscilloscope for applying a negative voltage therein of sufficient value to cut off the cathode ray beam whenever the sweep wave deviates beyond said limits, said blanking circuit having voltage responsive control elements for rendering the blanking circuit effective in response to voltages of predetermined magnitudes, said voltage responsive elements having a pair of connections to which the sweep wave is applied in opposite polarity relationships.

J. L. THEISEN.